L. W. THOMPSON.
ELECTRIC REGULATOR.
APPLICATION FILED FEB. 26, 1915.

1,209,517.

Patented Dec. 19, 1916.
2 SHEETS—SHEET 1.

UNITED STATES PATENT OFFICE.

LOUIS WILLARD THOMPSON, OF NEW YORK, N. Y., ASSIGNOR TO GENERAL ELECTRIC COMPANY, A CORPORATION OF NEW YORK.

ELECTRIC REGULATOR.

1,209,517.  Specification of Letters Patent.  Patented Dec. 19, 1916.

Application filed February 26, 1915. Serial No. 10,694.

*To all whom it may concern:*

Be it known that I, LOUIS WILLARD THOMPSON, a citizen of the United States, and a resident of the borough of Manhattan, city, county, and State of New York, have invented certain new and useful Improvements in an Electric Regulator, of which the following is a description, accompanied by drawings.

This invention relates to electric regulators, but more particularly to alternating current voltage regulators, for automatically maintaining the voltage of a generator by effecting momentary changes in the field of the generator, such changes being greater than those which would be required to restore the desired voltage if the changed condition in the field of the generator were continuously maintained.

In voltage regulators of this character, in which the momentary changes in the field of the generator are effected in response to the generator voltage, the electrical and mechanical inertia of the parts produces a fluctuation in the generator voltage much greater than the small fluctuation necessary to the operation of the field changing means. This condition, commonly known as "hunting," is highly objectionable.

The primary object of this invention is, therefore, to provide a regulator which shall be substantially free from "hunting." To this end means, to the operation of which fluctuations in the generator voltage are not essential, are employed to impart to the controlling member of the field changing means a vibratory movement. The means to produce this vibratory movement comprise an oscillatory circuit, including a condenser and the winding of the regulator, which is responsive to the generator voltage, or an independent winding adapted to act cumulatively with said regulator winding. To modify the vibratory movement and prolong its duration a resiliently supported weight is attached to the field changing means.

Obviously other oscillatory circuits and connections may be devised without departing from the spirit of the invention, and I am not to be understood as limiting the invention to the apparatus shown and described, which is illustrative of preferred forms of the invention.

Figure 1:
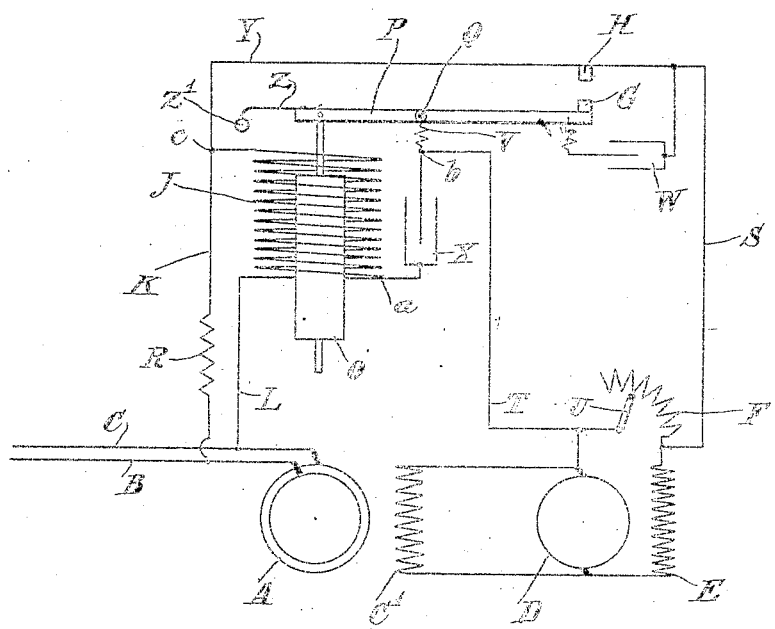
Figure 2:
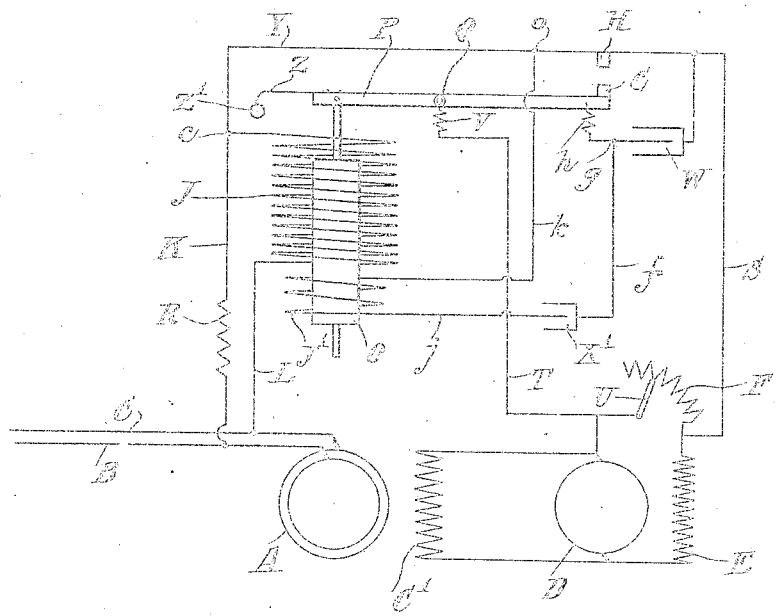

In the drawings, Figure 1 is a diagrammatic representation of circuits and apparatus for carrying out the invention, and Fig. 2 is a similar representation of a modification.

Referring to the drawings, A represents an alternating current generator connected to the mains B, C, the voltage upon which is to be regulated. The field C' of the alternator is excited by a direct current exciter D and the voltage of the mains B, C is regulated by regulating the excitation. The voltage of the exciter D is varied, by varying the strength of its field E, in the circuit of which is shown an exciter rheostat F. This rheostat F, as shown, may be short circuited by means of the contacts G and H controlled by suitable means.

In the drawings, I have illustrated two modifications of suitable electro-responsive means for controlling the alternate opening and closing of contacts G—H.

With particular reference to Fig. 1, a solenoid J is connected across the mains B—C, by means of the leads K and L, in one of which a non-inductive resistance R is preferably inserted as usual. A magnetic core O is suspended from one end of the lever P, which is pivotally supported at Q and carries the contact G at the other end. Contact G is adapted to coöperate with the stationary contact H to control the field of the exciter, and these contacts are preferably made of carbon to avoid the usual objections to metal contacts. A conductor Y extends between the point $c$ on the solenoid J and the contact H. A conductor S connects one side of the exciter rheostat F with the contact H, while the contact G is in electrical connection with the other side of the exciter rheostat F through the lever P, flexible conductor V, conductor T, and rheostat arm U, so that upon the engagement of the contacts G and H the resistance of the rheostat F will be short circuited and upon the disengagement of said contacts said resistance will be inserted in the field of the exciter. On large installations, a condenser W is preferably shunted around the contacts G and H to prevent sparking.

For a purpose hereinafter described, a condenser X is connected between the point $a$ on the solenoid J and the point $b$ on the flexible conductor V and a weight $Z^1$ is supported from the lever P by means of the resilient connection Z.

In the modification shown in Fig. 2, the core O is acted upon by a second coil $J^1$, in circuit with which is arranged a condenser $X^1$. The circuit including said coil and the condenser $X^1$ is connected by means of the leads $k$ and $f$ between the point $o$ on the lead Y and the point $g$ which is electrically connected through the flexible conductor $h$ to the movable contact G. Otherwise the modification shown in Fig. 2 is in all respects similar to that of Fig. 1.

I, at present, understand the operation of my regulator to be as follows: With special reference to the modification shown in Fig. 1, let us assume that the voltage across the mains B—C drops slightly below the desired value. The strength of solenoid J will correspondingly be lowered with the result that the contact G is moved into engagement with the contact H, whereupon the rheostat F will be short circuited. Prior to the engagement of the contacts G and H, however, the condenser X was connected across the rheostat F and hence a charge was stored therein. Upon the engagement of the contacts G—H an oscillatory discharge of the condenser X will occur through a local circuit comprising the solenoid J, conductor Y, contact H, contact G, lever P, flexible conductor V and the condenser X, which discharge will momentarily augment the effect upon the core O of the solenoid J and cause the contacts G and H to be disengaged. Upon the disengagement of the contacts G and H it is probable that the charging current to the condenser X again augments the effect of the solenoid J upon the core, the effect of which would be to momentarily apply a force in a direction to increase the opening movement of contact G. After the disengagement of the contacts G and H, the effect of the solenoid J upon the core O returns to normal and the contacts G and H will be reëngaged, whereupon the cycle of movement will be repeated. The resiliently supported weight Z' improves the action of the regulator in that it modifies the responsiveness of the contact carrying lever P to the momentary changes in the solenoid J and hence modifies the amplitude and duration of the vibratory movement of said lever. The condenser W, as previously mentioned, prevents excessive sparking at the contacts G and H.

The operation of the modification shown in Fig. 2 is substantially the same as the operation of the modification shown in Fig. 1, the only difference being that in Fig. 2 a separate coil $J^1$ which coöperates with the coil J, receives the oscillatory discharges from the condenser $X^1$. If the voltage of the generator has the desired value, the mean position of the lever P will be such that in its vibrations the relative periods during which the contacts G and H are engaged or disengaged will be such that substantially no change in the voltage of the generator is effected by reason of the alternate engagement and disengagement of said contacts. If, however, the voltage of the generator falls below the desired value, the mean position of the lever P will be such that in its vibration the relative periods during which the contacts G and H are engaged or disengaged will be such that the voltage of the generator will be increased. Similarly, if the voltage of the generator rises above the desired value, the mean position of the lever P will be such that in its vibration the relative periods during which the contacts G and H are engaged or disengaged will be such that the voltage of the generator will be decreased.

It is, of course, obvious that if the voltage of the generator increases or decreases by a sufficiently large increment, the vibration of the lever P, due to the oscillatory circuit, will cease until the voltage of the generator again approaches the desired value.

I claim and desire to obtain by Letters Patent the following:

1. The combination with an alternating current circuit to be regulated, of a regulator comprising electro-responsive means, responsive to a departure from a desired condition, for restoring said desired condition, and means comprising a condenser for impressing an oscillatory current upon said electro-responsive means.

2. The combination with an alternating current circuit to be regulated, of a regulator comprising electro-responsive means, responsive to a departure from a desired condition for restoring said desired condition, an oscillatory circuit controlled by the regulator and including said electro-responsive means for impressing an oscillatory current upon said electro-responsive means.

3. The combination with an alternating currrent circuit to be regulated, of a regulator comprising electro-responsive means, responsive to a departure from a desired condition, for restoring said desired condition, and an oscillatory circuit controlled by the regulator for modifying the restoring action of said regulator.

4. The combination with an alternating current circuit to be regulated, of a regulator comprising an electro-responsive device and an oscillatory circuit adapted to be closed by said regulator, for influencing and modifying the action of said electro-responsive device.

5. The combination with an alternating current generator and its circuit to be regulated, of an electro-magnet responsive to the voltage in said circuit, contacts controlled by said magnet for regulating the voltage of the generator, and a condenser shunting the magnet and controlled by said contacts.

6. The combination with an alternating current generator and its circuit to be regulated, of an electro-magnet responsive to the voltage in said circuit, contacts controlled by said magnet for regulating the voltage of the generator, and a condenser brought into operation by the closing of said contacts for influencing and modifying the action of said electro-magnet.

7. The combination with an alternating current generator and its circuit to be regulated, of an electro-magnet responsive to the voltage in said circuit, contacts controlled by said magnet for regulating the voltage of the generator, and a condenser included in the circuit of the electro-magnet and connected to be discharged by the closing of said contacts.

8. The combination with an alternating current generator and its circuit to be regulated, of an electro-magnet responsive to the voltage in said circuit, contacts controlled by said magnet for regulating the voltage of the generator, and an oscillatory circuit, including the electro-magnet, and connected to be closed by said contacts.

9. In a regulator, the combination of an electro-responsive device, means for impressing alternating current voltage upon said device, means for superimposing oscillatory current upon said device, and regulating means controlled by said device.

10. The combination with an alternating current circuit to be regulated, of a regulator comprising a controlling magnet, and a condenser connected to be discharged by said magnet for altering the restoring power of said magnet.

11. The combination with an alternating current circuit to be regulated, of a regulator responsive to electrical conditions in said circuit, and a condenser for altering the responsiveness of said regulator to said conditions after it has been set in operation by said conditions.

12. The combination with an alternating current generator having a field, of a resistance affecting the strength of said field, contacts opening and closing to insert and withdraw said resistance, means responsive to variations of voltage of said generator from a desired value for opening and closing said contacts, said resistance being greater than that which would be required to effect the required change in voltage if continuously applied, and a condenser acting on said contact opening and closing means for modifying the operation thereof.

13. In a system of regulation for an alternating current generator, the combination of a generator, an exciter therefor, a resistance for the exciter field, a switch adapted to control the insertion and removal of said resistance, a lever carrying a movable contact of said switch, a mass resiliently supported on said lever, an electro-magnet responsive to the generator voltage for operating said lever, and a circuit including a condenser and a winding of said electro-magnet adapted either to be short circuited or to be placed in shunt to said resistance by the movement of said lever.

14. The combination with an alternating current generator of a regulator comprising a switch, a member carrying the movable element of said switch, an electromagnet responsive to an electrical condition of said generator for actuating said element, a mass resiliently supported on said member, a circuit including a winding of said electromagnet and means controlled by said switch for energizing said winding.

15. The combination with an alternating current generator of a regulator comprising an electromagnet responsive to an electrical condition of said generator, means operated by said electromagnet for regulating the electrical condition of said generator, a resiliently supported weight coöperating with said means to modify the action thereof, a circuit including a winding of said electromagnet, and means controlled by the first named means for energizing said winding.

16. In a regulator the combination of a switch having a movable contact, means comprising a member to which is operatively connected a core and on which is resiliently mounted a mass for operating said contact, a solenoid arranged to operate said core and an oscillatory circuit controlled by said switch to modify the effect of said solenoid upon said core.

17. In a regulator the combination of a switch having a movable contact, means comprising a member to which is operatively connected a core for operating said contact, a solenoid arranged to operate said core and means comprising an oscillatory circuit, controlled by said switch and acting upon said core, and a mass, resiliently supported by said member, to impart a vibratory movement to said contact.

18. In a system of regulation for an alternating current generator, the combination with the generator of a regulator comprising an electromagnet responsive to the generator voltage, a switch operated by said electromagnet for controlling the generator voltage, and an oscillatory circuit including a winding for said electromagnet and controlled by said switch.

In testimony whereof I have signed this specification in the presence of two subscribing witnesses.

LOUIS WILLARD THOMPSON.

Witnesses:
WALTER S. JONES,
HERBERT G. OGDEN.